United States Patent Office 3,623,858
Patented Nov. 30, 1971

3,623,858
METHOD OF PELLETIZING SERPENTINE CHRYSOTILE FINES AND PELLETED PRODUCTS THEREOF
Arthur Matthias Smith, Baltimore, Md., and William C. Streib, North Plainfield, N.J., assignors to Johns-Manville Corporation, New York, N.Y.
No Drawing. Filed Nov. 6, 1969, Ser. No. 874,685
Int. Cl. C05d 9/00
U.S. Cl. 71—62
6 Claims

ABSTRACT OF THE DISCLOSURE

A method of pelletizing serpentine chrysotile mineral fines with mineral acid, and the pelleted product of the action of the mineral acid with the serpentine chrysotile mineral.

BACKGROUND OF THE INVENTION

Serpentine chrysotile mineral fines, commonly a waste product from milling and separating fibrous asbestos products from ore, provides a low-cost source of magnesia and/or silica. However, because of the high proportion of very fine fractions and resulting therefrom very dusty characteristics, irregular and broad range of particle sizes, low solubility, among other frequently unwanted properties of typical serpentine chrysotile fines, this mineral material has found few applications notwithstanding its nominal cost.

SUMMARY OF THE INVENTION

This invention provides an effective and economical means of producing highly uniform sized, and thus convenient to handle, durable pellets from fines of serpentine chrysotile mineral materials through the application of and reaction with common mineral acids, and further which may render the substantially water insoluble essentially hydrated magnesium silicate serpentine chrysotile mineral material more soluble and thus more chemically reactive as well as physically more appropriate for handling and application. The means of this invention is uniquely applicable to the preparation of serpentine chrysotile mineral material for use as a soil nutrient for a source of magnesia which is required for balanced plant nutrition. In such an application, the means of this invention enhances both the handling properties of the fines for more effective application either alone or as combined with other plant nutrients in pelletized fertilizer products rendering it effectively dust free, cake resistant, and significantly more controllable for uniform distribution to the soil, and also its potential chemical activity in rendering it more water soluble for accelerated and greater nutritional release to the soil.

It is the primary objective of this invention to provide low cost and effective means of producing uniform and durable pellets from serpentine chrysotile mineral fines and increase the water solubility thereof, and in particular to provide a more effective magnesia nutrient for soil fertilization.

DESCRIPTION OF THE PREFERRED EMBODIMENT

This invention comprises the manufacture of pellets of substantially uniform particle size ranging from about 4 mesh to about 16 mesh of water dispersible magnesium material from a source of serpentine chrysotile mineral and specifically includes treating and reacting serpentine chrysotile materials with mineral acid, and the water soluble products of said serpentine chrysotile and common mineral acid, such as those which form water soluble magnesium salts comprising sulfuric, hydrochloric, nitric, etc. acids.

The sepentine chrysotile mineral components of this invention comprise any of the common hydrated magnesium silicates of the serpentine family typically categorized by the frequently given in texts and other literature formulations of $Mg \cdot 3Si_2O_5(OH)_4$ or $$3MgO \cdot 2SiO_2 \cdot 2H_2O$$

Such mineral materials have heretofore been considered as an economical source of magnesium for plant fertilizers but the limited solubility, typical fibrous nature, extreme particle configuration and size distribution, and dusty properties of the fine mineral materials, among other handicaps, did not provide an effective rate of release of soluble magnesium for a suitable source thereof for good plant nutrition or governable application properties for uniform and controlled spreading, particularly when combined with other fertilizers as in a composite product, aside from its disagreeable handling characteristics due to its dusty nature. Moreover, with most economical sources of serpentine chrysotile mineral materials such as the low cost "tailings," "floats," "fines," and the like rejects or waste products of the asbestos industry which otherwise renders their use highly feasible, the problems of dust and controlled application are at their worst. The serpentine chrysotile minerals for use in this invention nevertheless may be of any source including the aforementioned hitherto unsuitable "tailings," "floats," "fines" and the like rejects or waste products, but of whatever source it is preferred that the material be of a relatively fine particle size, desirably less than about $-30$ mesh whereby such low cost waste materials including asbestos "tailings," etc. are particularly applicable.

The mineral acid agents of this invention, for example sulfuric, hydrochloric, nitric and the like, have been found to markedly increase the amount of available magnesium for plant nutrition or other activity, evidently through the conversion of insoluble forms of magnesia in the minerals to more soluble compounds, as well as effecting a strong adhesion of the fine serpentine chrysotile particles into relatively large integrated bodies or pellets of effective particle size and confined range of distribution for more practical handling and controlled application, either alone or in combination with typical granulated fertilizer products. Moreover, these acid produced pellets or granules exhibit high cohesive strength permitting routine handling and storing, mixing if required, and spreading techniques.

Although higher concentrations are effective, preferably the mineral acids are dilute, for example about 5 to 10% by weight of the aqueous solution, to enable safer handling, prolong equipment life, and provide effective quantities or proportions of a liquid phase in relation to the solids without acid waste, among other reasons. For effective and economical pelleting or granulating to the prescribed and most feasible sized particle distribution, the liquid phase of the acid component should constitute about 25% by weight of the serpentine chrysotile mineral solids, with approximately 20% to approximately 30% providing typical effectively workable ranges giving adequate proportions of liquid to solids to accrete the fine particles into suitable sized bodies and effectively adhere the same without the needless inclusion of excesses of liquid and the attendant cost of subsequent liquid removal or acid waste. Concerning the application of the liquid component, it may be appropriate to take into consideration the initial moisture content of the fines.

Such aqueous solutions of typical mineral acids have been found to be highly effective in uniting the fine serpentine chrysotile mineral particles into coherent pellets or granules of ample strengths and integrity to effectively endure and survive handling or transportation and storage in either bags or packaged units, and bulk form, as well as mechanical mixing or blending and in particular the usual manipulative operations encountered in service in the fertilizer or agricultural industry. However, when the pelleted product of this invention is to be employed as a fertilizer or component thereof wherein the overriding prerequisite for this application being to provide an effective and available water soluble plant nutrient, the invention is restricted to the use of those acids which produce water soluble magnesium salts and in turn a pellet or granule which in water disperses itself or the magnesium content thereof is readily water leachable. Sulfuric, hydrochloric and nitric acid all provide soluble magnesium salts as well as strong integrated pellets or granules which are quickly dispersible in water, and as such constitute the preferred means of this invention. Phosphoric acids on the other hand, although effectively adhering the serpentine chrysotile fine materials into securely bonded pellets, produce insoluble magnesium phosphates salts which are thus not available in the soil as an effective source for plant nutrition.

Upon the addition of the acid agent in accordance with the foregoing prerequisites, the pelletizing may be completed simply by thorough admixing to the extent of effectively distributing the liquid component substantially throughout the serpentine chrysotile solids whereupon the liquid phase accretes the fine particles in movement into larger and substantially uniform bodies, and the action of the acid upon the serpentine chrysotile adhesively unites the collected particles of such large bodies into a strongly integrated unit. This mixing operation can most effectively and conveniently be carried out with conventional mixers which produce a rolling type action upon the material and which includes common fertilizer processing equipment such as typical rotary drum or the like rolling mixers or fertilizer granulators. The products so obtained are of effective particle size, that is substantially all through 3 mesh and substantially all retained on 20 mesh, with the majority sized from 4 to 16 mesh and preferably 4 to 10 mesh, which constitutes a particularly effective limited size range for handling and for controlling application as a fertilizer either alone or combined with commercial fertilizer ingredients or products.

Drying of the wet or dampened serpentine chrysotile pellets can be achieved in the mixer if their retention therein is economically feasible, or the formed pellets can be dried in a subsequent operation comprising for example a commercial rotary drier, passing through an oven, or simply by effective exposure to the atmosphere while at a state of relatively low humidity.

Without limiting this invention to any mechanism of physical or chemical activity, or theory relating thereto, it appears, based upon observation and experience, that the acid, at least in part, reacts with the magnesium silicate contents of the serpentine mineral converting the same to a corresponding magnesium salt(s), and to silicic acid which upon drying functions as a bonding agent strongly uniting and integrating the accreted fines into durable coherent bodies containing the soluble magnesium salts.

The following examples illustrate specific and preferred means as well as advantageous novel products of this invention and demonstrate the effectiveness thereof.

To a series of 500 gram weight samples of −30 mesh serpentine chrysotile mineral tailings, aqueous solutions of several common inorganic acids in concentrations of both 5% and 10% by weight, were added in amounts of 130 milliliters, or about 26% by weight of acid solution based on the solid serpentine mineral. The fine serpentine chrysotile solids and liquid acid solutions were found to effectively ball simpy upon thorough mixing. Effective and uniform pelleting was achieved by thoroughly admixing the components in a "pony" mixer of the Hobart type and the size of the pelleted nodules could be controlled, or increased in size by rolling in a drum, or for small quantities in common metal cans turned on a roll table, for a suitable time, for example about 5 minutes. The granulated products were found to be of a size substantially all retained on a number 20 mesh screen and passing through a number 10 mesh screen.

The effects of the acid and concentration thereof and the overall treatments described above are all set forth in the following table.

| Example | Acid | Pellet crumbling strengths | | Dispersibility of acid formed pellet in water |
|---|---|---|---|---|
| | | 5% | 10% | |
| 1 | $H_2SO_4$ | Semi-hard | Hard | Disperses easily. |
| 2 | HCl | do | do | Do. |
| 3 | $H_3PO_4$ | do | do | Does not disperse. |

The pronounced effect upon solubility of the acid treatment is demonstrated by the following data. The amount of sulfuric acid applied is given in percentage of acid solids based upon serpentine mineral solids.

| Serpentine pelletizing condition: | Percent soluble magnesium |
|---|---|
| None | 0.11 |
| 2.6% $H_2SO_4$ | 0.55 |
| 8.5% $H_2SO_4$ | 1.00 |
| 10.0% $H_2SO_4$ | 1.30 |

We claim:
1. Method of pelletizing serpentine chrysotile mineral fines comprising adding to the serpentine chrysotile mineral fines an aqueous solution of mineral acid of about 5 to about 10% by weight concentration, said aqueous solution of mineral acid being added in amount of approximately 20 to approximately 30% by weight of the said serpentine chrysotile mineral fines material, and admixing to distribute the acid solution and accrete the serpentine chrysotile mineral fines into pellets.

2. The method of pelletizing serpentine chrysotile mineral fines of claim 1, wherein the mineral acid and the serpentine chrysotile mineral fines are admixed in a rotary mixer.

3. The method of pelletizing serpentine chrysotile mineral fines of claim 1, wherein the mineral acid added to the serpentine chrysotile mineral fines is sulfuric acid, and said aqueous solution of sulfuric acid and serpentine chrysotile mineral fines are admixed in a rotary drum granulator.

4. The method of pelletizing serpentine chrysotile mineral fines of claim 1, wherein the mineral acid added to the serpentine chrysotile mineral fines is selected from the group consisting of sulfuric, hydrochloric and nitric, and said aqueous solution of mineral acid and said serpentine chrysotile mineral fines material are admixed in a rotary drum granulator until substantially all particles are sized from about 4 mesh to about 16 mesh.

5. Free flowing pellets comprising the substantially water soluble product of the action of adding and admixing of serpentine chrysotile mineral fines with an aqueous solution of approximately 5 to approximately 10% by weight concentration of mineral acid, said aqueous solution of mineral acid having been added in amount of about 20 to about 30% by weight of the said serpentine chrysotile mineral fines material.

6. The pellets of claim 5, wherein the pellets comprise the substantially water soluble product of serpentine chrysotile mineral fines admixed with an aqueous solution of sulfuric acid, said aqueous solution of sulfuric acid having been added in amount of about 25% by weight of the said serpentine chrysotile mineral fines material.

(References on following page)

References Cited

UNITED STATES PATENTS

| | | | |
|---|---|---|---|
| 2,402,370 | 6/1946 | Chalmers | 71—62 X |
| 2,929,693 | 3/1960 | Alkinson | 23—313 |
| 3,446,612 | 5/1969 | Taylor | 71—62 X |
| 3,347,620 | 10/1967 | Yamashita et al. | 71—40 X |

FOREIGN PATENTS

| | | |
|---|---|---|
| 694,941 | 9/1964 | France. |

OTHER REFERENCES

Pulverized Serpentine as a Source of Available Magnesium, Burns et al., Ag. Chem., September 1965, pp. 23–26.

REUBEN FRIEDMAN, Primary Examiner

R. BARNES, Assistant Examiner

U.S. Cl. X.R.

23—313; 71—64 DA